(12) United States Patent
Divorra Escoda et al.

(10) Patent No.: US 9,516,340 B2
(45) Date of Patent: Dec. 6, 2016

(54) METHODS AND APPARATUS SUPPORTING MULTI-PASS VIDEO SYNTAX STRUCTURE FOR SLICE DATA

(75) Inventors: Oscar Divorra Escoda, Catalunya (ES); Peng Yin, West Windsor, NJ (US); Purvin Bibhas Pandit, Franklin Park, NJ (US)

(73) Assignee: Thomson Licensing (FR)

(*) Notice: Subject to any disclaimer, the term of this patent is extended or adjusted under 35 U.S.C. 154(b) by 688 days.

(21) Appl. No.: 12/451,543

(22) PCT Filed: May 29, 2008

(86) PCT No.: PCT/US2008/006806
§ 371 (c)(1),
(2), (4) Date: Nov. 17, 2009

(87) PCT Pub. No.: WO2008/156548
PCT Pub. Date: Dec. 24, 2008

(65) Prior Publication Data
US 2010/0124273 A1    May 20, 2010

Related U.S. Application Data (60) Provisional application No. 60/943,406, filed on Jun. 12, 2007.

(51) Int. Cl.
*H04N 19/543*    (2014.01)
*H04N 19/176*    (2014.01)
(Continued)

(52) U.S. Cl.
CPC .......... *H04N 19/543* (2014.11); *H04N 19/119* (2014.11); *H04N 19/14* (2014.11);
(Continued)

(58) Field of Classification Search
CPC .. H04N 19/119; H04N 19/14; H04N 19/174; H04N 19/176; H04N 19/194; H04N 19/46; H04N 19/543; H04N 19/61; H04N 19/70

USPC ...................................................... 375/240.01
See application file for complete search history.

(56) References Cited

U.S. PATENT DOCUMENTS

| | | |
|---|---|---|
| 2006/0193385 A1 | 8/2006 | Yin et al. |
| 2007/0121731 A1 | 5/2007 | Tanizawa et al. |

(Continued)

FOREIGN PATENT DOCUMENTS

| | | |
|---|---|---|
| JP | 2007116351 | 5/2007 |
| WO | WO2007063808 | 6/2007 |

(Continued)

OTHER PUBLICATIONS

De Forni, R. et al.; "On the Benefits of Leaf Merging in Quad-tree Motion Models"; IEEE International Conference on Image Processing; Sep. 11-14, 2005; pp. 858-861.*

(Continued)

*Primary Examiner* — Behrooz Senfi
*Assistant Examiner* — Maria Vazquez Colon
(74) *Attorney, Agent, or Firm* — Jack Schwartz & Associates, PLLC (57) ABSTRACT

There are provided methods and apparatus supporting a multi-pass video structure for slice data. An apparatus includes an encoder for encoding at least one syntax data element related to at least two partitions of at least a portion of a picture. The at least one syntax element is encoded within a multi-pass syntax structure. The at least one syntax element belongs to a given class of data. The encoder encodes the at least one syntax data element with respect to all partitions of at least the portion of the picture prior to encoding a next class of data, wherein later coded data classes, including the next class, have at least one of an explicit coding and an implicit coding of at least one of a casual dependency and a non-casual dependency with respect to earlier coded data classes coded earlier than the next class.

18 Claims, 7 Drawing Sheets

(51) Int. Cl.
  *H04N 19/70* (2014.01)
  *H04N 19/119* (2014.01)
  *H04N 19/46* (2014.01)
  *H04N 19/61* (2014.01)
  *H04N 19/14* (2014.01)
  *H04N 19/174* (2014.01)
  *H04N 19/194* (2014.01)

(52) U.S. Cl.
  CPC ......... *H04N 19/174* (2014.11); *H04N 19/176* (2014.11); *H04N 19/194* (2014.11); *H04N 19/46* (2014.11); *H04N 19/61* (2014.11); *H04N 19/70* (2014.11)

(56) References Cited

U.S. PATENT DOCUMENTS

2008/0212677 A1* 9/2008 Chen .................... H04N 19/176 375/240.16
2009/0232206 A1   9/2009 Boon et al.
2009/0323803 A1* 12/2009 Gomila ............... H04N 19/172 375/240.02

FOREIGN PATENT DOCUMENTS

WO   WO2008027192   3/2008
WO   WO2008123254   10/2008
WO   WO2008156548   12/2008

OTHER PUBLICATIONS

Wenger, S.; "H.264/AVC Over IP"; IEEE Transactions on Circuits and Systems for Video Technology; Jul. 2003; vol. 13, issue 7; pp. 645-656.*

R. De Forni and D. S. Taubman, "On the benefits of leaf merging in quad-tree motion models," IEEE International Conference on Image Processing 2005, 2005, pp. II-858-61.*

De Forni et al., "On the Benefits of Leaf Merging in Quad-Tree Motion Models", Int'l. Conference on Image Processing, ICIP 2005, Genova, Italy, Sep. 11-14, 2005, IEEE, Piscataway, NJ, USA, vol. 2, pp. 858-861.

Wenger, "H.264/AVC Over IP", IEEE Transactions on Circuits and Systems for Video Technology, vol. 13, No. 7, Jul. 1, 2003.

International Search Report, dated Dec. 1, 2008.

* cited by examiner

METHODS AND APPARATUS SUPPORTING MULTI-PASS VIDEO SYNTAX STRUCTURE FOR SLICE DATA

CROSS-REFERENCE TO RELATED APPLICATIONS

This application claims the benefit, under 35 U.S.C. §365 of International Application PCT/US2008/006806, filed May 29, 2008 which was published in accordance with PCT Article 21(2) on Dec. 24, 2008 in English and which claims the benefit of U.S. provisional patent application No. 60/943,406 filed Jun. 12, 2007.

TECHNICAL FIELD

The present principles relate generally to video encoding and decoding and, more particularly, to methods and apparatus supporting multi-pass video syntax structure for slice data.

BACKGROUND

In some coding strategies, coding of a syntax element in a frame partition (such as a macroblock, sub-block and/or block), may be conditioned or dependent on the data assigned to syntax elements from the whole neighborhood (causal and non-causal according to the coding scanning order). Typical Macroblock data coding, for example, such as that performed in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard") impairs the use of such coding strategies, as no data from later macroblocks in the scanning order is available.

The MPEG-4 AVC Standard proposes a slice data partitioning in three categories in which data is basically divided as follows: Category A is all data but the residual; Category B is part one of residual data; and Category C is part two of residual data. The aim of data partitioning is error resilience. At the decoder, we can merge the syntax of the three categories into one complete case and perform one pass parsing based on scanning order. The MPEG-4 AVC Standard does not allow conditional and/or dependent coding of motion data with respect to the mode data of the whole macroblock and/or block neighborhood. Also, the MPEG-4 AVC Standard does not allow the insertion of other syntax data classes within mode data and motion data.

Practical applications such as leaf merging in accordance with a first prior art approach only focus on the algorithm and do not supply an ordered scheme for proper systematic encoding of data.

The leaf merging paradigm relies on the fact that, in the field of image coding, it has recently been shown that quad-tree schemes for representing geometric image features are unable to obtain the optimal exponentially decaying rate-distortion behavior. This problem can be rectified by following rate-distortion (R-D) optimal tree pruning with a leaf merging step. In consideration of the same, the first prior art approach noted that quad-tree based motion representations for video compression suffer from the same fundamental shortcomings, which can again be overcome by leaf merging. Based on these observations, the first prior art approach proposes a non-iterative extension to the existing model used by the MPEG-4 AVC Standard, where after a first tree decomposition, neighboring blocks are adaptively merged for joint coding. This generates a series of causal and non-causal dependencies among blocks where prediction is coded, their coding mode and merging side information. For this purpose, access to some classes of data in a non-causal manner with respect to the scanning order is necessary. However, the first prior art approach does not supply a systematic and ordered way of encoding the necessary data classes for leaf merging into the coded stream. Indeed, for every block, merging hypotheses are tested. If the compression efficiency improves by merging with a neighboring block then merging is enabled for that block to be merged with the selected target block. The possible merging targets for a given block depend on the neighboring block modes and on the particular mode of the merging candidate block. Hence, the merging side information depends on all neighboring block modes and the particular mode of the merging candidate block. Finally, prediction coding will depend on the merging side information for a block which at the same time depends on the merging side information of neighboring blocks and the local and neighboring coding mode.

Figure 1:
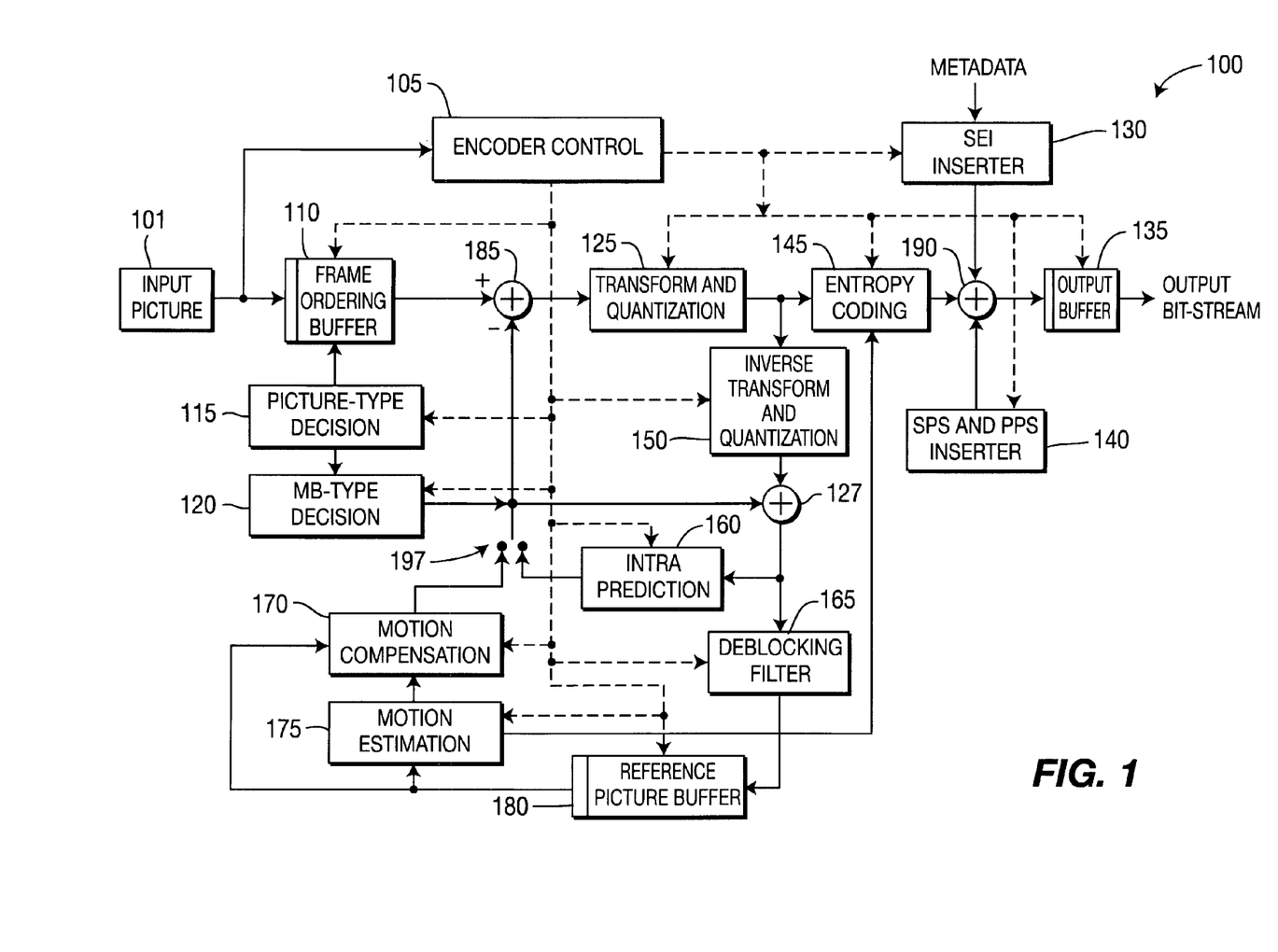
FIG. 1 shows a block diagram for a video encoder capable of performing video encoding in accordance with the MPEG-4 AVC Standard.

Turning to FIG. 1, a video encoder capable of performing video encoding in accordance with the MPEG-4 AVC standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, an input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 127. An output of the combiner 127 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. An output of the switch 197 is connected in signal communication with a second non-inverting input of the combiner 127.

Inputs of the frame ordering buffer 110 and the encoder controller 105 are available as input of the encoder 100, for receiving an input picture 101. Moreover, an input of the Supplemental Enhancement Information (SEI) inserter 130 is available as an input of the encoder 100, for receiving metadata. An output of the output buffer 135 is available as an output of the encoder 100, for outputting a bitstream.

Figure 2:
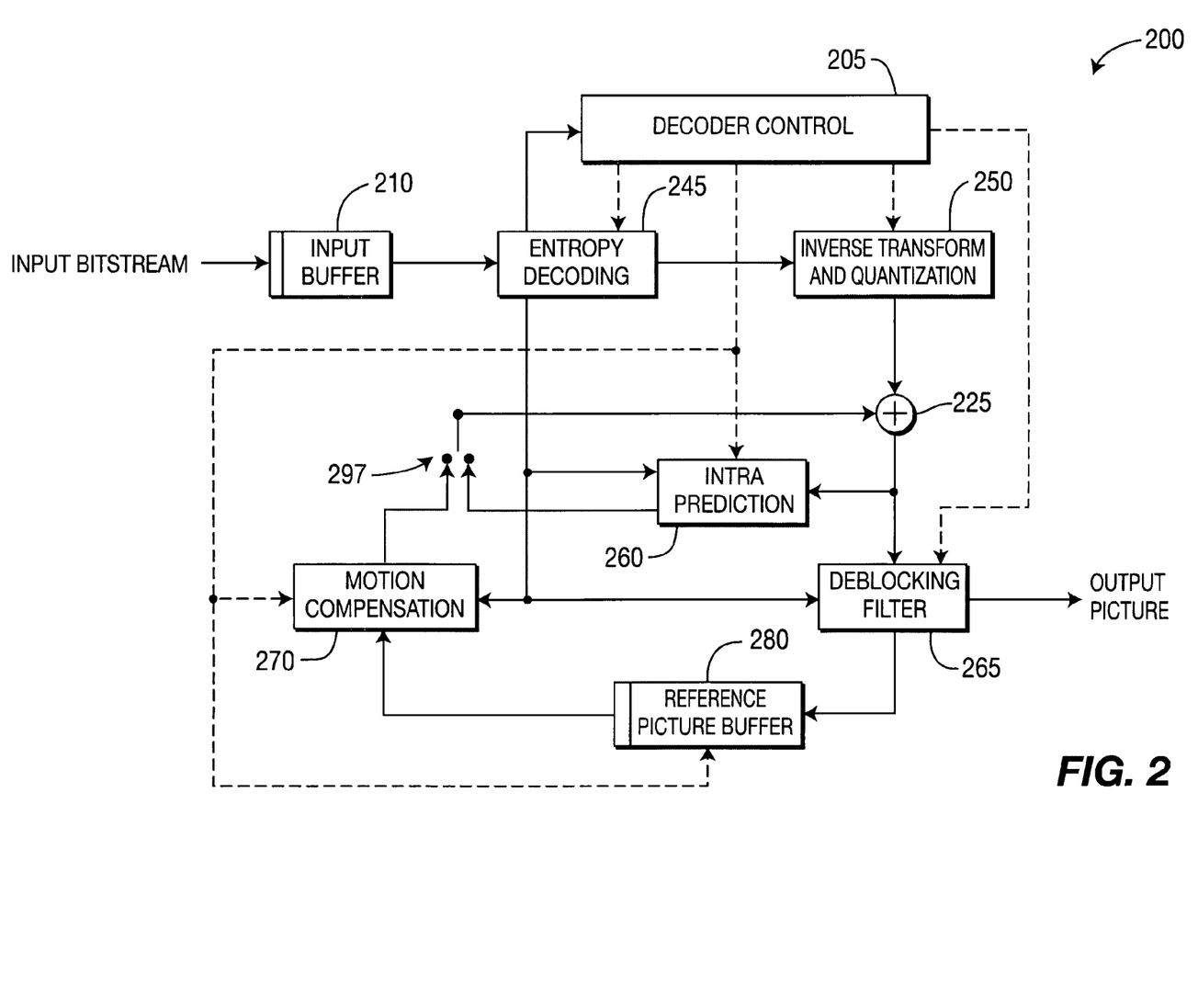
FIG. 2 shows a block diagram for a video decoder capable of performing video decoding in accordance with the MPEG-4 AVC Standard.

Turning to FIG. 2, a video decoder capable of performing video decoding in accordance with the MPEG-4 AVC standard is indicated generally by the reference numeral 200.

The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 400, for receiving an input bitstream. A first output of the deblocking filter 265 is available as an output of the decoder 200, for outputting an output picture.

SUMMARY

These and other drawbacks and disadvantages of the prior art are addressed by the present principles, which are directed to methods and apparatus supporting multi-pass video syntax structure for slice data.

According to an aspect of the present principles, there is provided an apparatus. The apparatus includes an encoder for encoding at least one syntax data element related to at least two partitions of at least a portion of a picture. The at least one syntax element is encoded within a multi-pass syntax structure. The at least one syntax element belongs to a given class of data. The encoder encodes the at least one syntax data element with respect to all partitions of at least the portion of the picture prior to encoding a next class of data, wherein later coded data classes, including the next class, have at least one of an explicit coding and an implicit coding of at least one of a casual dependency and a non-casual dependency with respect to earlier coded data classes coded earlier than the next class.

According to another aspect of the present principles, there is provided a method. The method includes encoding at least one syntax data element related to at least two partitions of at least a portion of a picture. The at least one syntax element is encoded within a multi-pass syntax structure. The at least one syntax element belongs to a given class of data. The encoding step encodes the at least one syntax data element with respect to all partitions of at least the portion of the picture prior to encoding a next class of data, wherein later coded data classes, including the next class, have at least one of an explicit coding and an implicit coding of at least one of a casual dependency and a non-casual dependency with respect to earlier coded data classes coded earlier than the next class.

According to yet another aspect of the present principles, there is provided an apparatus. The apparatus includes a decoder for decoding at least one syntax data element related to at least two partitions of at least a portion of a picture. The at least one syntax element is decoded from a multi-pass syntax structure. The at least one syntax element belongs to a given class of data. The decoder decodes the at least one syntax data element with respect to all partitions of at least the portion of the picture prior to decoding a next class of data, wherein later decoded data classes, including the next class, have at least one of an explicit decoding and an implicit decoding of at least one of a casual dependency and a non-casual dependency with respect to earlier decoded data classes decoded earlier than the next class.

According to a further aspect of the present principles, there is provided a method. The method includes decoding at least one syntax data element related to at least two partitions of at least a portion of a picture. The at least one syntax element is decoded from a multi-pass syntax structure. The at least one syntax element belongs to a given class of data. The decoding step decodes the at least one syntax data element with respect to all partitions of at least the portion of the picture prior to decoding a next class of data, wherein later decoded data classes, including the next class, have at least one of an explicit decoding and an implicit decoding of at least one of a casual dependency and a non-casual dependency with respect to earlier decoded data classes decoded earlier than the next class.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus supporting multi-pass video syntax structure for slice data.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
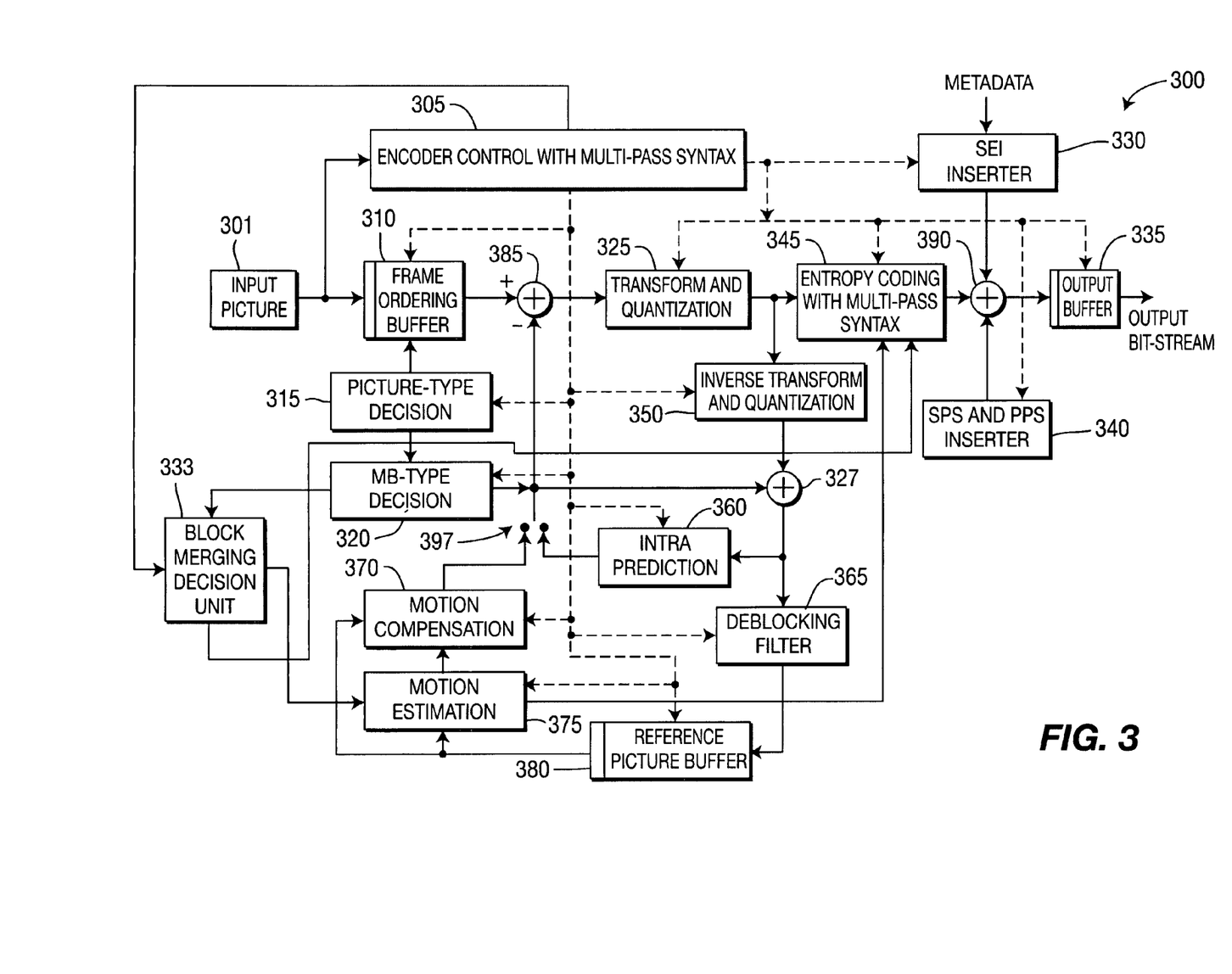
FIG. 3 shows a block diagram for an exemplary video encoder capable of performing video encoding in accordance with the MPEG-4 AVC Standard, extended for use with the present principles, according to an embodiment of the present principles.

Turning to FIG. 3, a video encoder capable of performing video encoding in accordance with the MPEG-4 AVC standard is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder with multi-pass syntax 345 and a first input of an inverse transformer and inverse quantizer 350. An output of the entropy coder with multi-pass syntax 345 is connected in signal communication with a first non-inverting input of a combiner 390. An output of the combiner 390 is connected in signal communication with a first input of an output buffer 335.

A first output of an encoder controller with multi-pass syntax 305 is connected in signal communication with a second input of the frame ordering buffer 310, a second input of the inverse transformer and inverse quantizer 350, an input of a picture-type decision module 315, an input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller with multi-pass syntax 305 is connected in signal communication with a first input of a Supplemental Enhancement Information (SEI) inserter 330, a second input of the transformer and quantizer 325, a second input of the entropy coder with multi-pass syntax 345, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 327. An output of the combiner 327 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375. A first output of the motion estimator 375 is connected in signal communication with a second input of the motion compensator 370. A second output of the motion estimator 375 is connected in signal communication with a third input of the entropy coder with multi-pass syntax 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. An output of the switch 397 is connected in signal communication with a second non-inverting input of the combiner 327.

A third output of the encoder controller with multi-pass syntax 305 is connected in signal communication with a second input of a block merging decision unit 333. A second output of a macroblock-type decision module 320 is connected in signal communication with a first input of the block merging decision unit 333. A first output of the block merging decision unit 333 is connected in signal communication with a fourth input of the entropy coder with multi-pass syntax 345. A second output of the block merging decision unit 333 is connected in signal communication with a third input of the motion estimator 375.

Inputs of the frame ordering buffer 310 and the encoder controller with multi-pass syntax 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
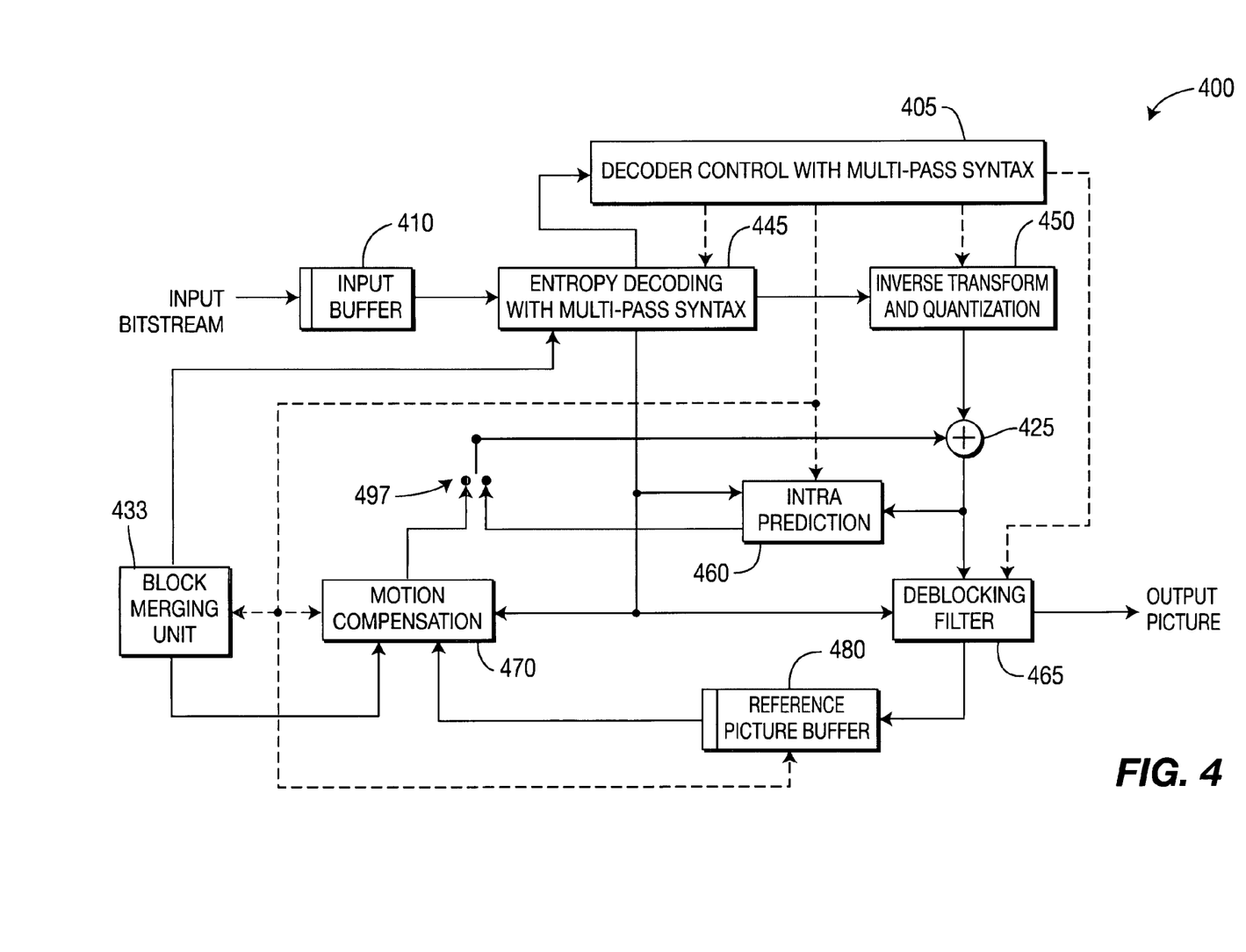
FIG. 4 shows a block diagram for an exemplary video decoder capable of performing video decoding in accordance with the MPEG-4 AVC Standard, extended for use with the present principles, according to an embodiment of the present principles.

Turning to FIG. 4, a video decoder capable of performing video decoding in accordance with the MPEG-4 AVC standard is indicated generally by the reference numeral 400.

The video decoder 400 includes an input buffer 410 having an output connected in signal communication with a first input of an entropy decoder with multi-pass syntax 445. A first output of the entropy decoder with multi-pass syntax 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder with multi-pass syntax 445 is connected in signal communication with a third input of the motion compensator 470 and a first input of the deblocking filter 465. A third output of the entropy decoder with multi-pass syntax 445 is connected in signal communication with an input of a decoder controller with multi-pass syntax 405. A first output of the decoder controller with multi-pass syntax 405 is connected in signal communication with a second input of the entropy decoder with multi-pass syntax 445. A second output of the decoder controller with multi-pass syntax 405 is connected in signal communication with a second input of the inverse transformer and inverse quantizer 450. A third output of the decoder controller with multi-pass syntax 405 is connected in signal communication with a third input of the deblocking filter 465. A fourth output of the decoder controller with multi-pass syntax 405 is connected in signal communication with a second input of the intra prediction module 460, with a first input of the motion compensator 470, with a second input of the reference picture buffer 480, and with an input of a block merging unit 433. A first output of the block merging unit 433 is connected in signal communication with a third input of the entropy decoder with multi-pass syntax 445. A second output of the block merging unit 433 is connected in signal communication with a fourth input of the motion compensator 470.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus supporting multi-pass video syntax structure for slice data.

In accordance with an embodiment, we divide macroblock data in slice data syntax in several classes and the data of each class is outputted for all macroblocks prior to outputting the data of the next class. This allows the use of already decoded data in a full macroblock neighborhood of a given syntax class for conditional and/or dependent encoding of the other syntax data classes that are encoded later with respect to the given syntax class. In an embodiment, we allow for the use of data conditional coding based on leaf merging techniques, for example, such as that relating to the above-described first prior art approach. Indeed, based on the macroblock mode data from the full macroblock neighborhood and dedicated extra syntax for indicating merging information (both kinds of data encoded in different passes of the slice syntax), data such as motion and/or a reference picture can be conditionally encoded.

Thus, in accordance with an embodiment, we propose a multi-pass syntax structure for slice data coding. The proposed multi-pass structure for slice data coding allows conditional and/or dependent coding and/or parsing of macroblock syntax elements and/or block syntax elements taking into account the full neighborhood (causal and non-causal) of that macroblock and/or block.

In one embodiment, a multi-pass syntax structure is utilized for slice data coding. Several successive coding loops are used within slice data in order to encode in order, first all mode and/or sub-mode related data for all macroblocks, and later prediction related data with residual related data. Residual related data can be further partitioned according to the MPEG-4 AVC Standard data categories. In addition, in order to insert conditional coding of prediction using side information, further data classes can be inserted within slice data passes in the form of additional data passes.

As noted above, an embodiment of the multi-pass slice data syntax structure is directed to leaf merging coding techniques. In an embodiment, first all mode data within a slice is encoded in the usual scanning order of macroblocks and sub-blocks. Then a second syntax pass encodes all merging information for all macroblocks and sub-blocks. This second pass, based on the all-around neighboring information from the mode data of the first pass, derives many coding rules for conditional and/or implicit coding of merging information for the current block. A third pass conditionally (and/or implicitly) encodes prediction data depending on the data already available (for example, in an embodiment, mode and merging information from all macroblocks).

Figure 5:
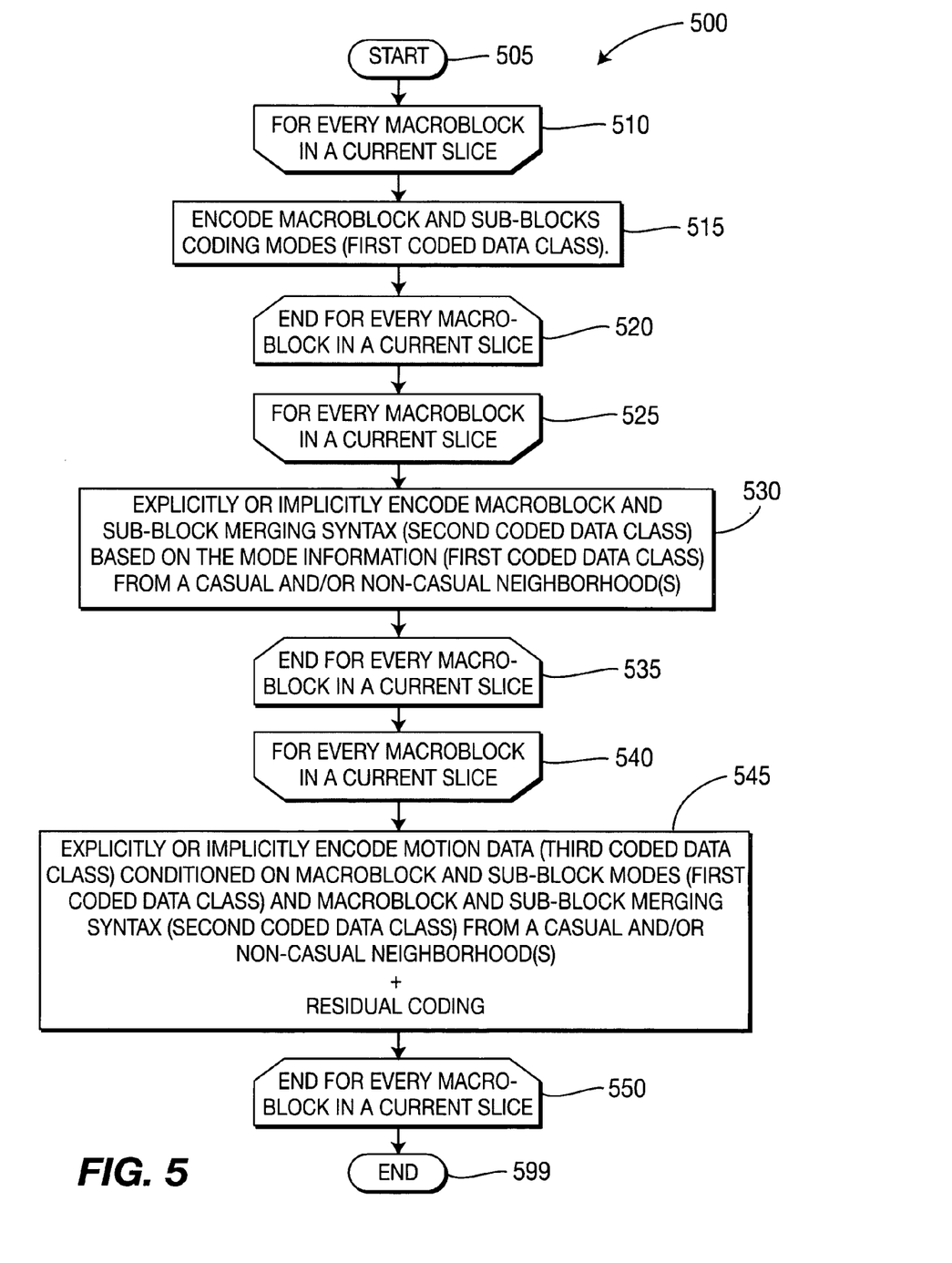
FIG. 5 shows a flow diagram for an exemplary method for multi-pass syntax coding for slice data, according to an embodiment of the present principles.

Turning to FIG. 5, an exemplary method for multi-pass syntax coding for slice data is indicated generally by the reference numeral 500.

The method 500 includes a start block 505 that passes control to a loop limit block 510. The loop limit block 510 performs a loop over every macroblock in a current slice (being processed), and passes control to a function block 515. The function block 515 encodes the macroblock and sub-block coding modes, and passes control to a loop limit block 520. The loop limit block 520 ends the loop over every macroblock in the current slice, and passes control to a loop limit block 525. The loop limit block 525 performs a loop over each macroblock in a current slice, and passes control to a function block 530. The function block 530 explicitly or implicitly encodes macroblock and sub-block merging syntax (for a second coded data class), based on the mode information (for a first coded data class) from a casual and/or non-casual neighborhood(s) with respect to the current macroblock, and passes control to a loop limit block 535. The function block 535 ends the loop over each macroblock in the current slice, and passes control to a loop limit block 540. The loop limit block 540 performs a loop over every macroblock in a current slice, and passes control to a function block 545. The function block 545 explicitly or implicitly encodes motion data (for a third coded data class) conditioned on macroblock and sub-block modes (for the first coded data class) and the macroblock and sub-block merging syntax (for the second coded data class) from the casual and/or non-casual neighborhood(s) with respect to the current macroblock and residual coding, and passes control to a loop limit block 550. The loop limit block 550 ends the loop over each macroblock in the current slice, and passes control to an end block 599.

Figure 6:
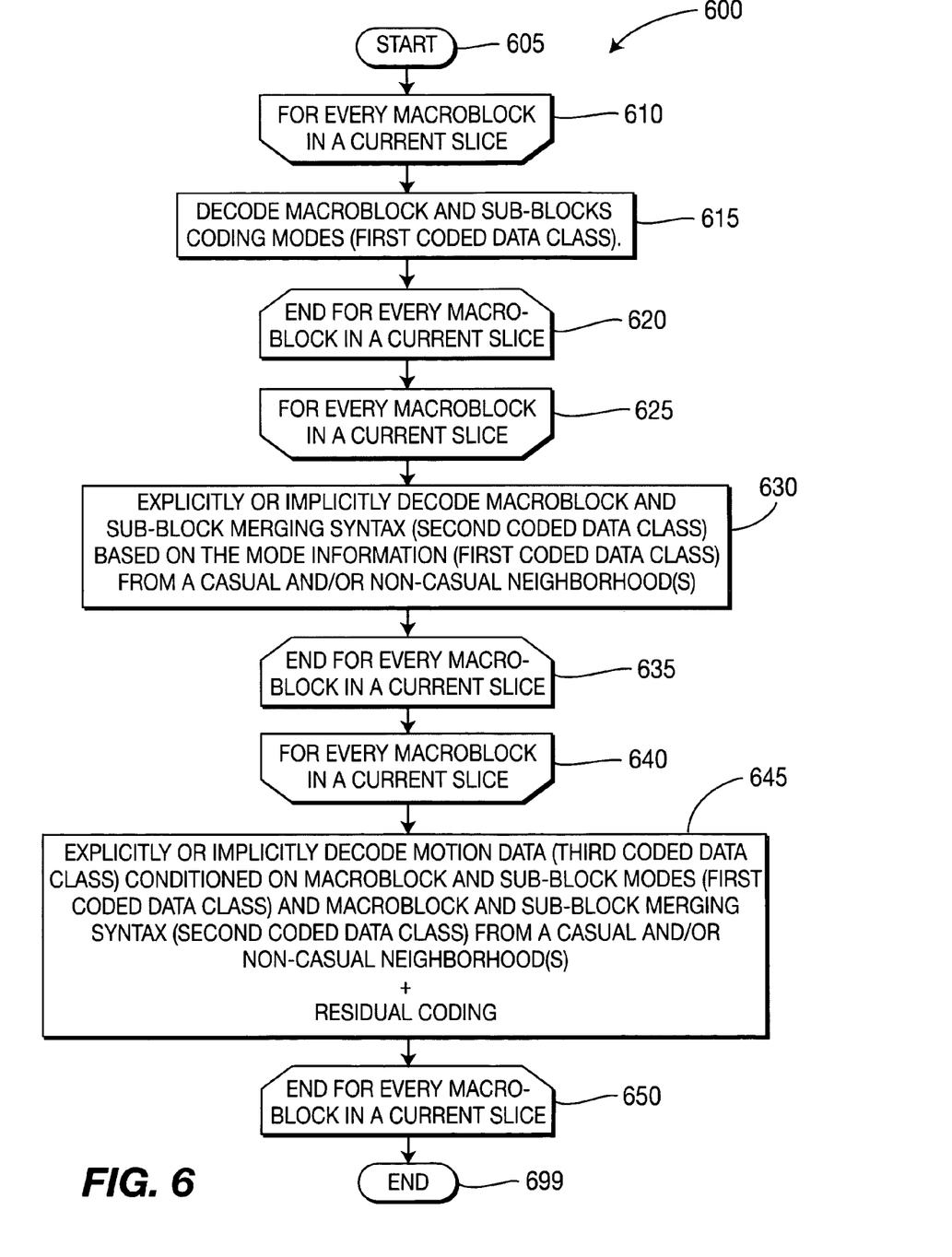
FIG. 6 shows a flow diagram for an exemplary method for multi-pass syntax decoding for slice data, according to an embodiment of the present principles.

Turning to FIG. 6, an exemplary method for multi-pass syntax decoding for slice data is indicated generally by the reference numeral 600.

The method 600 includes a start block 605 that passes control to a loop limit block 610. The loop limit block 610 performs a loop over every macroblock in a current slice (being processed), and passes control to a function block 615. The function block 615 decodes the macroblock and sub-block coding modes, and passes control to a loop limit block 620. The loop limit block 620 ends the loop over every macroblock in the current slice, and passes control to a loop limit block 625. The loop limit block 625 performs a loop over each macroblock in a current slice, and passes control to a function block 630. The function block 630 explicitly or implicitly decodes macroblock and sub-block merging syntax (for a second coded data class) based on the mode information (for a first coded data class) from a casual and/or non-casual neighborhood(s) with respect to the current macroblock, and passes control to a loop limit block 635. The function block 635 ends the loop over each macroblock in the current slice, and passes control to a loop limit block 640. The loop limit block 640 performs a loop over every macroblock in a current slice, and passes control to a function block 645. The function block 645 explicitly or implicitly decodes motion data (for a third coded data class) conditioned on macroblock and sub-block modes (for the first coded data class) and the macroblock and sub-block merging syntax (for the second coded data class) from the casual and/or non-casual neighborhood(s) and residual coding, and passes control to a loop limit block 650. The loop limit block 650 ends the loop over each macroblock in the current slice, and passes control to an end block 699.

Figure 7:
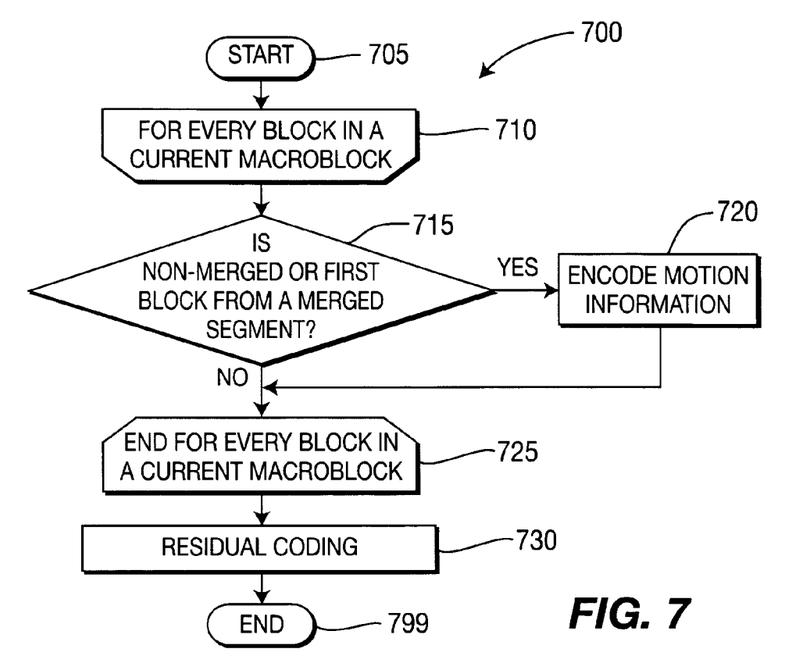
FIG. 7 shows a flow diagram for an exemplary method for coding motion vectors and residual for one macroblock in a multi-pass syntax coding of slice data, according to an embodiment of the present principles.

Turning to FIG. 7, an exemplary method for coding motion vectors and residual for one macroblock in a multi-pass syntax coding of slice data is indicated generally by the reference numeral 700.

The method 700 includes a start block 705 that passes control to a loop limit block 710. The loop limit block 710 performs a loop over every block in a current macroblock, and passes control to a decision block 715. The decision block 715 determines whether or not the current block is non-merged or a first block from a merged segment. If so, control is passed to a function block 720. Otherwise, control is passed to a loop limit block 725.

The function block 720 encodes motion information, and passes control to the loop limit block 725.

The loop limit block 725 ends the loop over every block in the current macroblock, and passes control to a function block 730. The function block 730 performs residual coding, and passes control to an end block 799.

Figure 8:
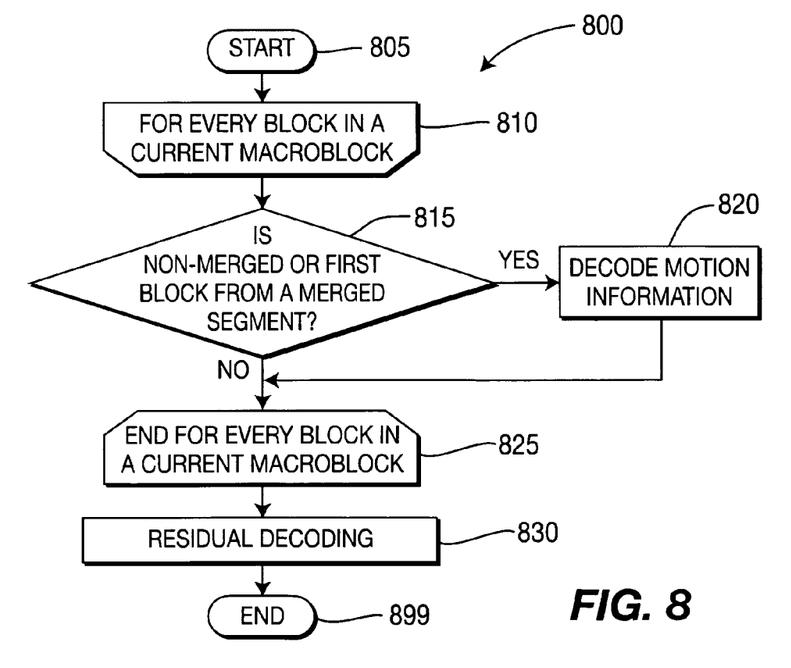
FIG. 8 shows a flow diagram for an exemplary method for decoding motion vectors and residual for one macroblock in a multi-pass syntax decoding of slice data, according to an embodiment of the present principles.

Turning to FIG. 8, an exemplary method for decoding motion vectors and residual for one macroblock in a multi-pass syntax decoding of slice data is indicated generally by the reference numeral 800.

The method 800 includes a start block 805 that passes control to a loop limit block 810. The loop limit block 810 performs a loop over every block in a current macroblock, and passes control to a decision block 815. The decision block 815 determines whether or not the current block is non-merged or a first block from a merged segment. If so, control is passed to a function block 820. Otherwise, control is passed to a loop limit block 825.

The function block 820 decodes motion information, and passes control to the loop limit block 825.

The loop limit block 825 ends the loop over every block in the current macroblock, and passes control to a function block 830. The function block 830 performs residual decoding, and passes control to an end block 899.

The following Tables explicitly describe an embodiment of multi-pass slice syntax data coding for conditional and/or dependent coding of prediction data using leaf merging and merging side information.

TABLE 1 shows syntax for a slice_data( ) function for multi-pass slice syntax data coding in accordance with an embodiment of the present principles.

TABLE 1

| slice_data( ) { | C | Descriptor |
|---|---|---|
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   LastMbInSliceAddr = CurrMbAddr | | |
|   moreDataFlag = 1 | | |
|   prevMbSkipped = 0 | | |
|   do { | | |
|     if( slice_type != I && slice_type != SI ) | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( CurrMbAddr ) | | |
|         moreDataFlag = more_rbsp_data( ) | | |
|       } else { | | |
|         mb_skip_flag | 2 | ae(v) |
|         moreDataFlag = !mb_skip_flag | | |
|       } | | |
|     if( moreDataFlag ) { | | |
|       if( MbaffFrameFlag && ( CurrMbAddr % 2 == 0 || | | |
|         ( CurrMbAddr % 2 == 1 && prevMbSkipped) ) ) | | |
|         mb_field_decoding_flag | 2 | u(1) \| ae(v) |
|         macroblock_layer_getMBmode_only( ) | 2 | |
|     } | | |
|     if( !entropy_coding_mode_flag ) | | |
|       moreDataFlag = more_rbsp_data( ) | | |
|     else { | | |
|       if( slice_type != I && slice_type != SI ) | | |
|         prevMbSkipped = mb_skip_flag | | |
|       if( MbaffFrameFlag && CurrMbAddr % 2 == 0 ) | | |
|         moreDataFlag = 1 | | |
|       else { | | |
|         end_of_slice_flag | 2 | ae(v) |
|         moreDataFlag = !end_of_slice_flag | | |
|       } | | |
|     } | | |
|     CurrMbAddr = NextMbAddress( CurrMbAddr ) | | |
|     if(moreDataFlag) LastMbInSliceAddr = CurrMbAddr | | |
|   } while( moreDataFlag ) | | |
|   CurrMbAddr = first_mb_in_slice * ( 1 + MbaffFrameFlag ) | | |
|   moreDataFlag = 1 | | |
|   do{ | | |
|     macroblock_layer_getMergeInfo_only( ) | 2 | |
|     CurrMbAddr = NextMbAddress( CurrMbAddr ) | | |
|     moreDataFlag = !(LastMbInSliceAddr < CurrMbAddr) | | |
|   }while(moreDataFlag) | | |
|   CurrMbAddr = first_mb_in_slice * ( 1 + MbaffFrameFlag ) | | |
|   moreDataFlag = 1 | | |
|   do{ | | |
|     macroblock_layer_getPredictionData&Residual_only( ) | 2\|3\|4 | |
|     CurrMbAddr = NextMbAddress( CurrMbAddr | | |

TABLE 1-continued

| slice_data( ) { | C | Descriptor |
|---|---|---|
|     moreDataFlag = !(LastMbInSliceAddr < CurrMbAddr) | | |
|   }while(moreDataFlag) | | |
| } | | |

TABLE 2 shows syntax for a macroblock_layer_getMBmode_only( ) function for multi-pass slice syntax data coding in accordance with an embodiment of the present principles.

TABLE 2

```
macroblock_layer_getMBmode_only( ){
                mb_type                                              2   ue(v) | ae(v)
if( mb_type != I_PCM ) {
                noSubMbPartSizeLessThan8x8Flag = 1
    if( mb_type != I_NxN &&
        MbPartPredMode( mb_type, 0 ) != Intra_16x16 &&
                            NumMbPart( mb_type ) == 4 ) {
        sub_mb_pred_subMBMode_only( mb_type )                        2
        for( mbPartIdx = 0; mbPartIdx < 4; mbPartIdx++ )
            if( sub_mb_type[ mbPartIdx ] != B_Direct_8x8 ) {
                if( NumSubMbPart( sub_mb_type[ mbPartIdx ] ) > 1 )
                    noSubMbPartSizeLessThan8x8Flag = 0
            } else if( !direct_8x8_inference_flag )
                    noSubMbPartSizeLessThan8x8Flag = 0
    }
}
```

TABLE 3 shows syntax for a macroblock_layer_getMergeInfo_only( ) function for multi-pass slice syntax data coding in accordance with an embodiment of the present principles.

TABLE 3

```
macroblock_layer_getMergeInfo_only( ){
    if(mb_type != I_PCM && mb_type != I_NxN &&
        MbPartPredMode( mb_type, 0 ) != Intra_16x16 &&
                            NumMbPart( mb_type ) == 4 ) {
            sub_mb_get_mergeinfo(mb_type)                            2
    }else{
        if((mb_type != SKIP || (mb_type == SKIP &&
```

TABLE 3-continued

```
macroblock_layer_getMergeInfo_only( ){
getNumberofEnteringMergedLeafs(CurrMbAddr)>0) ) &&
getNumberofPossibleMergeTargets(mb_type, CurrMbAddr)!=0)){
                            get_mergeinfo(mb_type)                   2
        }
    }
}
```

TABLE 4 shows syntax for a macroblock_layer_getPredictionData&Residual_only( ) function for multi-pass slice syntax data coding in accordance with an embodiment of the present principles.

TABLE 4

| macroblock_layer_getPredictionData&Residual_only( ){ | | |
|---|---|---|
|     if( mb_type == I_PCM ) { | | |
|         while( !byte_aligned( ) ) | | |
|             pcm_alignment_zero_bit | 2 | f(1) |
|         for( i = 0; i < 256; i++ ) | | |
|             pcm_sample_luma[ i ] | 2 | u(v) |
|         for( i = 0; i < 2 * MbWidthC * MbHeightC; i++ ) | | |
|             pcm_sample_chroma[ i ] | 2 | u(v) |
|     } else { | | |
|     if( mb_type != I_NxN && | | |
|         MbPartPredMode( mb_type, 0 ) != Intra_16x16 && | | |
|                     NumMbPart( mb_type ) == 4 ) { | | |
|         sub_mb_pred_PredictionData_only ( mb_type ) | 2 | |
|     } else { | | |
|         if( transform_8x8_mode_flag && mb_type == I_NxN ) | | |
|             transform_size_8x8_flag | 2 | u(1) | ae(v) |
|         mb_pred( mb_type ) | 2 | |
|     } | | |
|     if( MbPartPredMode( mb_type, 0 ) != Intra_16x16 ){ | | |
|         coded_block_pattern | 2 | me(v) | ae(v) |
|         if( CodedBlockPatternLuma > 0 && | | |
|             transform_8x8_mode_flag && mb_type != I_NxN && | | |

TABLE 4-continued

```
macroblock_layer_getPredictionData&Residual_only( ){
                noSubMbPartSizeLessThan8x8Flag &&
                ( mb_type != B_Direct_16x16 || direct_8x8_inference_flag ) )
                transform_size_8x8_flag                                                 2    u(1) | ae(v)
        }
        if( CodedBlockPatternLuma > 0 || CodedBlockPatternChroma > 0 ||
                MbPartPredMode( mb_type, 0 ) == Intra_16x16 ) {
                mb_qp_delta                                                             2    se(v) | ae(v)
                residual( )                                                             3|4
        }
    }
}
```

TABLE 5 shows syntax for a sub_mb_pred subMBMode_only (mb_type) function for multi-pass slice syntax data coding in accordance with an embodiment of the present principles.

TABLE 5

```
sub_mb_pred subMBMode_only ( mb_type ) {           C       Descriptor
    for( mbPartIdx = 0; mbPartIdx < 4;
    mbPartIdx++ )
```

TABLE 5-continued

```
sub_mb_pred subMBMode_only ( mb_type ) {           C       Descriptor
        sub_mb_type[ mbPartIdx ]                   2       ue(v) | ae(v)
}
```

TABLE 6 shows syntax for a sub_mb_pred_PredictionData_only (mb_type) function for multi-pass slice syntax data coding in accordance with an embodiment of the present principles.

TABLE 6

```
sub_mb_pred_PredictionData_only( mb_type ) {                                            C    Descriptor
    for( mbPartIdx = 0; mbPartIdx < 4; mbPartIdx++ )
        if( ( num_ref_idx_l0_active_minus1 > 0 || mb_field_decoding_flag ) &&
            mb_type != P_8x8ref0 &&
            sub_mb_type[ mbPartIdx ] != B_Direct_8x8 &&
            SubMbPredMode( sub_mb_type[ mbPartIdx ] ) != Pred_L1 )
            ref_idx_l0[ mbPartIdx ]                                                     2    te(v) | ae(v)
    for( mbPartIdx = 0; mbPartIdx < 4; mbPartIdx++ )
        if( (num_ref_idx_l1_active_minus1 > 0 || mb_field_decoding_flag ) &&
            sub_mb_type[ mbPartIdx ] != B_Direct_8x8 &&
            SubMbPredMode( sub_mb_type[ mbPartIdx ] ) != Pred_L0 )
            ref_idx_l1[ mbPartIdx]                                                      2    te(v) | ae(v)
    for( mbPartIdx = 0; mbPartIdx < 4; mbPartIdx++ )
        if( sub_mb_type[ mbPartIdx ] != B_Direct_8x8 &&
            SubMbPredMode( sub_mb_type[ mbPartIdx ] ) != Pred_L1 )
            for( subMbPartIdx = 0;
                subMbPartIdx < NumSubMbPart( sub_mb_type[ mbPartIdx ] );
                subMbPartIdx++)
                for( compIdx = 0; compIdx < 2; compIdx++ )
                    if(isFirstBlockofMergedSegment (mb_type, CurrMbAddr, mbPartIdx,
subMbPartIdx))
                        mvd_l0[ mbPartIdx ][ subMbPartIdx ][ compIdx ]                  2    se(v) | ae(v)
    for( mbPartIdx = 0; mbPartIdx < 4; mbPartIdx++ )
        if( sub_mb_type[ mbPartIdx ] != B_Direct_8x8 &&
            SubMbPredMode( sub_mb_type[ mbPartIdx ] ) != Pred_L0 )
            for( subMbPartIdx = 0;
                subMbPartIdx < NumSubMbPart( sub_mb_type[ mbPartIdx ] );
                subMbPartIdx++)
                for( compIdx = 0; compIdx < 2; compIdx++ )
if(isFirstBlockofMergedSegment (mb_type, CurrMbAddr, mbPartIdx, subMbPartIdx))
                        mvd_l1 [ mbPartIdx ][ subMbPartIdx ][ compIdx ]                 2    se(v) | ae(v)
}
```

TABLE 7 shows syntax for a mb_pred(mb_type) function for multi-pass slice syntax data coding in accordance with an embodiment of the present principles.

TABLE 7

```
mb_pred( mb_type ) {                                                                    C    Descriptor
    if( MbPartPredMode( mb_type, 0 ) = = Intra_4x4 ||
        MbPartPredMode( mb_type, 0 ) = = Intra_8x8 ||
        MbPartPredMode( mb_type, 0 ) = = Intra_16x16 ) {
```

TABLE 7-continued

| mb_pred( mb_type ) { | C | Descriptor |
|---|---|---|
|     if( MbPartPredMode( mb_type, 0 ) = = Intra_4x4 ) | | |
|         for( luma4x4BlkIdx=0: luma4x4BlkIdx<16: luma4x4BlkIdx++ ) { | | |
|             prev_intra4x4_pred_mode_flag[ luma4x4BlkIdx ] | 2 | u(1) \| ae(v) |
|             if( !prev_intra4x4_pred_mode_flag[ luma4x4BlkIdx ] ) | | |
|                 rem_intra4x4_pred_mode[ luma4x4BlkIdx ] | 2 | u(3) \| ae(v) |
|         } | | |
|     if( MbPartPredMode( mb_type, 0 ) = = Intra_8x8 ) | | |
|         for( luma8x8BlkIdx=0: luma8x8BlkIdx<4: luma8x8BlkIdx++ ) { | | |
|             prev_intra8x8_pred_mode_flag[ luma8x8BlkIdx ] | 2 | u(1) \| ae(v) |
|             if( !prev_intra8x8_pred_mode_flag[ luma8x8BlkIdx ] ) | | |
|                 rem_intra8x8_pred_model luma8x8BlkIdx ] | 2 | u(3) \| ae(v) |
|         } | | |
|     if( chroma_format_idc != 0 ) | | |
|         intra_chroma_pred_mode | 2 | ue(v) \| ae(v) |
|     } else if( MbPartPredMode( mb_type, 0 ) != Direct ) { | | |
|         for( mbPartIdx = 0: mbPartIdx < NumMbPart( mb_type ); mbPartIdx++) | | |
|             if( ( num_ref_idx_l0_active_minus1 > 0 \|\| | | |
|                 mb_field_decoding_flag ) && | | |
|                 MbPartPredMode( mb_type, mbPartIdx ) != Pred_L1 ) | | |
|             ref_idx_l0[ mbPartIdx ] | 2 | te(v) \| ae(v) |
|         for( mbPartIdx = 0: mbPartIdx < NumMbPart( mb_type ); mbPartIdx++) | | |
|             if(( num_ref_idx_l1_active_minus1 > 0 \|\| | | |
|                 mb_field_decoding_flag ) && | | |
|                 MbPartPredMode( mb_type, mbPartIdx ) != Pred_L0 ) | | |
|             ref_idx_l1[ mbPartIdx ] | 2 | te(v) \| ae(v) |
|         for( mbPartIdx = 0; mbPartIdx < NumMbPart( mb_type ); mbPartIdx++) | | |
|             if( MbPartPredMode ( mb_type, mbPartIdx ) != Pred_L1 ) | | |
|                 for( compIdx = 0; compIdx < 2; compIdx++ ) | | |
| if(isFirstBlockofMergedSegment (mb_type, CurrMbAddr. mbPartIdx)) | | |
|                     mvd_l0[ mbPartIdx ][ 0 ][ compIdx ] | 2 | se(v) \| ae(v) |
|         for( mbPartIdx = 0: mbPartIdx < NumMbPart( mb_type ): mbPartIdx++) | | |
|             if( MbPartPredMode( mb_type, mbPartIdx ) != Pred_L0 ) | | |
|                 for( compIdx = 0; compIdx < 2; compIdx++ ) | | |
| if(isFirstBlockofMergedSegment (mb_type, CurrMbAddr. mbPartIdx)) | | |
|                     mvd_l1[ mbPartIdx ][ 0 ][ compIdx ] | 2 | se(v) \| ae(v) |
|     } | | |
| } | | |

35

TABLE 8 shows syntax for a sub_mb_get_mergeinfo (mb_type) function for multi-pass slice syntax data coding in accordance with an embodiment of the present principles.

TABLE 8

| sub_mb_get_mergeinfo ( mb_type ) { | C | Descriptor |
|---|---|---|
|     for( mbPartIdx = 0; mbPartIdx < 4; mbPartIdx++ ) | | |
|         if(( sub_mb_type[ mbPartIdx ] != B_Direct_8x8 \|\| (sub_mb_type[ mbPartIdx] == | | |
| B_Direct_8x8 && getNumberofEnteringMergedLeafs(CurrMbAddr)>0))) | | |
|             for( subMbPartIdx = 0; | | |
|                 subMbPartIdx < NumSubMbPart( sub_mb_type[ mbPartIdx ] ); | | |
|                 subMbPartIdx++) | | |
| if(getNumberofPossibleMergeTargets(mb type, CurrMbAddr, mbPartIdx, | | |
| subMbPartIdx )!=0) { | | |
|                     mergeflag[ mbPartIdx ][ subMbPartIdx ] | 2 | f(1) |
|                 if(mergeflag[ mbPartIdx ][ subMbPartIdx ] && | | |
| getNumberofPossibleMergeTargets(mb_type, CurrMbAddr, mbPartIdx, subMbPartIdx)>1){ | | |
|                     mergedirection[ mbPartIdx ][ subMbPartIdx ] | 2 | se(v) \| ae(v) |
|                 } | | |
|             } | | |
|         } | | |
| } | | |

TABLE 9 shows syntax for a get_mergeinfo (mb_type) function for multi-pass slice syntax data coding in accordance with an embodiment of the present principles.

TABLE 9

| get_mergeinfo ( mb_type ) { | C | Descriptor |
|---|---|---|
|     for( mbPartIdx = 0: mbPartIdx < NumMbPart( mb_type ); mbPartIdx++) | | |
|         if(getNumberofPossibleMergeTargets(mb_type, mbPartIdx , CurrMbAddr)!=0) { | | |

TABLE 9-continued

| get_mergeinfo ( mb_type ) { | C | Descriptor |
|---|---|---|
| mergeflag[ mbPartIdx ] | 2 | se(v) \| ae(v) |
| if(mergeflag[ mbPartIdx ] && getNumberofPossibleMergeTargets(mb_type, CurrMbAddr, mbPartIdx)>1){ | | |
| mergedirection[ mbPartIdx ] | 2 | se(v) \| ae(v) |
| } | | |
| } | | |
| } | | |

A description will now be given of some of the many attendant advantages/features of the present invention, some of which have been mentioned above. For example, one advantage/feature is an apparatus that includes an encoder for encoding at least one syntax data element related to at least two partitions of at least a portion of a picture. The at least one syntax element is encoded within a multi-pass syntax structure. The at least one syntax element belongs to a given class of data. The encoder encodes the at least one syntax data element with respect to all partitions of at least the portion of the picture prior to encoding a next class of data, wherein later coded data classes, including the next class, have at least one of an explicit coding and an implicit coding of at least one of a casual dependency and a non-casual dependency with respect to earlier coded data classes coded earlier than the next class.

Another advantage/feature is the apparatus having the encoder as described above, wherein the encoder is an extended version of an existing encoder of an existing video coding standard or video coding recommendation.

Yet another advantage/feature is the apparatus having the encoder as described above, wherein the multi-pass syntax structure is used for slice syntax coding.

Still another advantage/feature is the apparatus having the encoder as described above, wherein a use of the multi-pass syntax structure is enabled or disabled using at least one syntax data field in a high level syntax element.

Moreover, another advantage/feature is the apparatus having the encoder as described above, wherein mode data and prediction data for the at least two partitions relate to different data classes.

Further, another advantage/feature is the apparatus having the encoder as described above, wherein the data includes mode data and motion data, and a particular class of data for leaf merging based coding is inserted within the mode data and the motion data.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus comprising:
an encoder for encoding at least one syntax data element related to at least two partitions of at least a portion of a picture,
wherein the at least one syntax element is encoded by a plurality of successive coding loops including a first loop that encodes macroblock and sub macroblock coding modes as a first data class,
wherein a later coding loop encodes a syntax data element of a second data class based on the coding modes,
wherein reference picture information is conditionally encoded in a coding loop after the later coding loop based on the coding modes and the syntax data element of the second data class,
wherein a use of the plurality of successive coding loops is enabled or disabled using at least one syntax data field in a high level syntax element.

2. The apparatus of claim 1, wherein the encoder is an extended version of an existing encoder of an existing video coding standard or video coding recommendation.

3. The apparatus of claim 1, wherein the plurality of successive coding loops is used for slice syntax coding.

4. A method comprising:
encoding at least one syntax data element related to at least two partitions of at least a portion of a picture,
wherein the at least one syntax element is encoded by a plurality of successive coding loops including a first loops that encodes macroblock and sub-macroblock coding modes as first data class wherein a later coding loop encodes a coded syntax data element of a second data class based on the coding modes, wherein reference picture information is conditionally encoded in a coding loop after the later coding loop, based on the coding modes and the syntax data element of the second data class, and wherein a use of the plurality of successive coding loops is enabled or disabled using at least one syntax data field in a high level syntax element.

5. The method of claim 4, wherein the method is performed by an encoder that is an extended version of an existing encoder of an existing video coding standard or video coding recommendation.

6. The method of claim 4, wherein the plurality of successive coding loops is used for slice syntax coding.

7. An apparatus comprising:
a decoder for decoding at least one syntax data element related to at least two partitions of at least a portion of a picture, wherein the at least one syntax element is decoded by a plurality of successive decoding loops including a first loop that decodes macro block and sub-macroblock coding modes as a first data class, wherein a later decoding loop decodes a syntax data element of a second data class based on the coding modes, wherein reference picture information is decoded in a decoding loop after the later decoding loop based on the coding modes and the syntax data element of the second data class, wherein a use of the plurality of successive decoding loops is enabled or disabled using at least one syntax data field in a high level syntax element.

8. The apparatus of claim 7, wherein the decoder is an extended version of an existing decoder of an existing video coding standard or video coding recommendation.

9. The apparatus of claim 7, wherein the plurality of successive coding loops is used for slice syntax decoding.

10. A method comprising:
decoding at least one syntax data element related to at least two partitions of at least a portion of a picture, wherein the at least one syntax element is decoded from a plurality of successive decoding loops including a first loop that decodes macroblock and sub-macroblock coding modes as a first data class, the at least one syntax element belonging to a given class of data, and said wherein the decoding of the at least one syntax data element uses already decoded data from surrounding macroblocks for a given class of data prior to decoding a next class of data, wherein later decoded data classes, wherein a later decoding loop decodes a syntax data element of a second data class based on the coding modes, wherein reference picture information is decoded in a decoding loop after the later decoding loop based on the coding modes and the syntax data element of the second data class, and wherein a use of the plurality of successive decoding loops is enabled or disabled using at least one syntax data field in a high level syntax element.

11. The method of claim 10, wherein the decoder is an extended version of an existing decoder of an existing video coding standard or video coding recommendation.

12. The method of claim 10, wherein the plurality of successive decoding loops is used for slice syntax decoding.

13. A non-transitory computer-readable storage medium storing computer executable instructions for performing a method comprising:

encoding at least one syntax data element related to at least two partitions of at least a portion of a picture, wherein the at least one syntax element is encoded by a plurality of successive coding loops including a first loop that encodes macroblock and sub macroblock coding modes as a first data class wherein a later coding loop encodes a syntax data element of a second data class based on the coding modes, wherein reference picture information is conditionally encoded in a coding loop after the later coding loop based on the coding modes and the syntax data element of the second data class, and wherein a use of the plurality of successive coding loops is enabled or disabled using at least one syntax data field in a high level syntax element.

14. The non-transitory computer-readable storage medium of claim 13, wherein the method is performed by an encoder that is an extended version of an existing encoder of an existing video coding standard or video coding recommendation.

15. The non-transitory computer-readable storage medium of claim 13, wherein the plurality of successive coding loops is used for slice syntax coding.

16. A non-transitory computer-readable storage medium storing computer executable instructions for performing a method comprising:

decoding at least one syntax data element related to at least two partitions of at least a portion of a picture, wherein the at least one syntax element is decoded from by a plurality of successive decoding loops including a first loop that decodes macro block and sub-macroblock coding modes as a first data class, wherein a later decoding loop decodes a syntax data element of a second data class based on the coding modes, wherein reference picture information is conditionally decoded in a decoding loop after the later decoding loop based on the coding modes and the syntax data element of a second data class, wherein a use of the plurality of successive decoding loops is enabled or disabled using at least one syntax data field in a high level syntax element.

17. The method of claim 16, wherein the decoder is an extended version of an existing decoder of an existing video coding standard or video coding recommendation.

18. The method of claim 16, wherein the plurality of successive decoding loops is used for slice syntax decoding.

* * * * *